United States Patent [19]

Kallianos et al.

[11] 3,878,851

[45] Apr. 22, 1975

[54] TOBACCO CASING MATERIAL

[75] Inventors: Andrew G. Kallianos; Lee G. Veasey, Jr.; Albert H. Warfield, all of Durham, N.C.

[73] Assignee: Liggett & Myers Incorporated, New York, N.Y.

[22] Filed: Mar. 8, 1973

[21] Appl. No.: 339,130

[52] U.S. Cl.................. 131/17 R; 131/144; 127/37
[51] Int. Cl............................................. A24b 15/04
[58] Field of Search....................................... 127/37; 131/140–144, 17

[56] References Cited
UNITED STATES PATENTS

| | | | |
|---|---|---|---|
| 2,930,720 | 3/1960 | Finberg | 131/17 |
| 3,003,895 | 10/1961 | Grunwald | 131/17 AD |
| 3,424,170 | 1/1969 | Grunwald et al. | 131/140 C |
| 3,542,035 | 11/1970 | Dierichs | 131/140 C |
| 3,565,687 | 2/1971 | Suminoe et al. | 127/37 |
| 3,586,537 | 6/1971 | Steiner et al. | 127/37 |
| 3,627,636 | 12/1971 | Jaffe et al. | 127/37 |

OTHER PUBLICATIONS

"Tobacco Flavoring For Smoking Products" (text) by Leffingwell et al. published by R. J. Reynolds Tobacco Co., Winston Salem, N.C.; 1972. pages 4-6 cited.

Primary Examiner—Melvin D. Rein
Attorney, Agent, or Firm—Kenyon & Kenyon

[57] ABSTRACT

This invention relates to tobacco and tobacco products and more particularly to a novel ingredient for use as a tobacco casing material, and to tobacco products impregnated therewith. The invention is the unique mixture of materials produced by the acid hydrolysis of oat hulls, and the use of said mixture of materials as a casing material for tobacco products.

9 Claims, No Drawings

TOBACCO CASING MATERIAL

OBJECTS

In the processing of tobacco, it is the present practice to blend with the tobacco at a predetermined time prior to the final stages of manufacture, certain agents which are designed to improve the physical and organoleptic properties of the product. These agents comprise flavoring substances, such as licorice or cocoa; flavor enhancers, such as natural essential oils; humectants, such as glycerol and propylene glycol; and sugars, such as glucose, sucrose or invert sugar.

The aforesaid agents are conventionally supplied in the form of a premixed composition known as the casing formulation or casing solution. This solution is usually applied to the tobacco by any convenient method, such as spraying or dipping.

It is an object of this invention to provide a source of sugar solids to partially or completely replace glucose, sucrose, invert sugar, and all other sugars normally used in the casing formulation.

It is a further object of this invention to provide a means whereby the normal concentration of sugar solids may be reduced in the casing formulation resulting in the addition of lower amounts of sugar to the tobacco without effecting changes in the taste or flavor of the smoke of the product.

It is a further object of this invention to provide a sweetening mixture which is superior in overall taste and aroma compared to corn syrup, sucrose, invert sugar and other sugar sources normally used in the casing formulation.

Further objects of this invention will become apparent from the following specification.

This invention is directed to the hydrolysis of xylan-containing materials to produce a unique mixture of materials, including large percentages of reducing sugars which can form the basis of a tobacco casing solution. These xylan-containing materials can be a previously discarded byproduct from the treatment of plant products.

A preferred starting material for utilization in this invention is oat hulls. The following detailed disclosure of the invention is directed to the use of oat hulls, but it is applicable to any natural source of xylan and cellulose which contains said materials in the proper proportions.

Oat hulls are by-products from the processing of oats and have been found to consist largely of xylan and $\alpha$-cellulose. This invention involves the discovery that said oat hulls can be hydrolyzed by treatment with dilute acids to produce a mixture of materials, consisting largely of xylose and glucose, which can serve as the basis for a tobacco casing solution.

In carrying out the invention, the oat hulls are ground in any suitable way such as in a milling machine so as to provide a more intimate mixing between said oat hulls and the hydrolyzing medium. The sizing of the ground hulls is not critical and we have generally found sizes in the range of about 20 to 200 mesh to be satisfactory. Following grinding, the oat hulls are mechanically suspended in a dilute aqueous solution of a mineral acid. While any water soluble acid will suffice, we have found that hydrochloric and sulfuric acids produce superior results. The concentration of the particular acid selected should be in the range of about 0.25 normal to about 1.0 normal to produce optimum yield. A preferred concentration is 0.5 normal. The amount of aqueous acid utilized should be in the range of about 4 milliliters to about 10 milliliters of dilute aqueous acid per gram of oat hulls.

The hydrolysis can be carried out by either of two equally suitable methods.

1. An aqueous suspension of oat hulls in dilute aqueous acid can be refluxed for a period ranging from about six hours to about twenty-four hours. If a shorter period of time is used, the yield is decreased, while refluxing for greater than twenty-four hours produces little additional product. The preferred refluxing time is about 6 to 7 hours.

2. The aqueous suspension of oat hulls in dilute aqueous acid is autoclaved for a period of about one-half hour to about 1 hour, with the preferred autoclaving time being about 45 minutes. Longer periods produce little additional product while shorter times produce only incomplete hydrolysis.

The autoclaving step is carried out at gauge pressures ranging from about 5 p.s.i. to about 30 p.s.i., with a preferred pressure of about 16 p.s.i. This indicates a range of temperature of about 108°C. to about 135°C., and a preferred temperature of about 122°C. Either method produces a yield of total reducing sugars of approximately 38%, calculated as D-glucose, and based on the dry weight of the hulls. Total reducing sugar determination was based on the procedure described by Technicon Corporation Autoanalyzer methodology as revised Feb. 11, 1960, utilizing glucose and/or xylose standard solutions for calibration. The procedure is based on the reduction in potassiusm ferricyanide to colorless potassium ferrocyanide in the presence of potassium cyanide as a sensitizing agent. The chemical reaction and color measurement are carried out automatically by the Autoanalyzer instrument.

The ratio of xylose to glucose in the oat hull hydrolysates was determined by reaction of a freeze-dried sample of the hydrolysate with Tri-Sil Z reagent (Pierce Chemical Company, Rockford, Illinois) in dry pyridine, to form trimethylsilyl derivatives, followed by gas chromatographic analysis of the mixture. Approximately 75% of the reducing sugars in oat hull hydroysate is xylose and 25% glucose. Small amounts of other sugars and water soluble materials are also present.

Digestion of the hydrolysate mixture with an appropriate enzyme preparation usually results in a slightly improved yield of reducing sugars. The digestion is carried out by stirring the hydrolysate mixture with the enzyme for about 1 hour at a temperature of about 40°C.

We have found in particular that the commercial enzyme preparation Rhozyme HP-150 (Rohm and Haas), which hydrolyzes pentose and hexose polysaccharides, gives a preferred result under the above conditions. Of course, if other suitable enzyme preparations are used, the conditions may need to be varied slightly.

Irrespective of the enzyme used, it should be denatured prior to any further treatment of the hydrolysate mixture. This is accomplished by autoclaving the mixture for about 15 minutes at a pressure of about 16 p.s.i. and a temperature of about 122°C.

In practice, it is usually necessary to adjust the pH of the aqueous oat hull hydrolysate to the range of about 5 to about 7. This is accomplished by the addition of a base, such as sodium hydroxide or calcium hydroxide. They are conveniently added in the form of dilute aqueous solutions. The pH can also be adjusted through the utilization of appropriate ion-exchange resins, such as Dowex 50W-X4, H+ form.

It may be necessary to concentrate the hydrolysate solution before incorporating it into the casing formulation, in order to accommodate the volume of water normally added to the rest of the ingredients. Generally it is useful if the hydrolysate material is concentrated to contain from about 30 grams to about 60 grams of material per 100 milliters of solution. This concentration can be accomplished by any appropriate method, such as freeze-drying, flash evaporation and rotary evaporation.

The amount of the concentrated hydrolysate added to the casing formula in accordance with this invention is largely a matter of choice. As a minimum, an effective amount is incorporated to achieve improved physical characteristics of the tobacco and to enhance the taste quality of the product or its smoke. A general range would be about 25 grams to about 250 grams of hydrolysate material per kilogram of tobacco with a preferred amount of about 42 grams of hydrolysate material per kilogram of tobacco.

It will be appreciated that other natural sources of xylan and mixtures of xylan and cellulose in the appropriate proportions, can be suitably substituted for oat hulls in the above procedure.

The compositions of this invention may also be produced by utilizing a solution of xylose, either alone or in conjunction with other reducing sugars, as a basis for said casing material.

Appropriate processes and equipment to prepare the agents of the invention will be apparent to those skilled in the art and form no part of the present invention. Suitable exemplary processes and equipment will be apparent from the following examples, which are intended to be illustrative and are not to be taken in a limiting sense.

EXAMPLE 1

A 5 gram sample of ground oat hulls was treated with 25 milliliters of 0.5 N hydrochloric acid by autoclaving for 30 minutes at 16 p.s.i. The resulting material was filtered, discarding the residue, and the solution adjusted to a pH of 5 with 10 N sodium hydroxide solution. Said solution was then stirred for one hour at 40°C. with 50 milligrams of Rhozyme HP-150, followed by autoclaving for 15 minutes at a pressure of 16 p.s.i. The total yield of reducing sugars was 29% by weight of original oat hulls, based on D-glucose as a standard.

EXAMPLE 2

A 5 gram sample of ground oat hulls was treated as in Example 1, except that the 0.5 N hydrochloric acid was replaced by 0.5 N sulfuric acid. The yield of reducing sugars was 40% by weight of original oat hulls. Analysis of this mixture for individual sugars was carried out by gas chromatography of trimethylsilyl derivatives. A yield of 24% xylose and 8% glucose, based on the weight of the original oat hulls, was found.

EXAMPLE 3

A 5 gram sample of ground oat hulls was treated as in Example 2, except that the treatment with Rhozyme HP-150 was omitted. The total yield of reducing sugars was 38%.

EXAMPLE 4

A 5 gram sample of ground oat hulls was refluxed with 25 ml of 0.5 N sulfuric acid for 6 hours. The resulting mixture was adjusted to pH 5 with an aqueous 10 N solution of sodium hydroxide, centrifuged to remove solid residue, and the supernatant solution analyzed for total reducing sugars by standard procedures. A yield of 38% was obtained.

EXAMPLE 5

A sample of approximately 420 grams of ground oat hulls was refluxed for 20 hours with 5 milliliters of 0.25 N sulfuric acid per gram of oat hulls and further treated as in Example 4. The clear hydrolysate was concentrated by a combination of flash evaporative and freeze-drying techniques to contain 32.5 g. of reducing sugars in approximately 70 ml of solution. This solution was used to replace the sugars normally added in an experimental casing formulation, which was then applied, by spraying, to a commercial blend of tobaccos. The treated tobacco was manufactured into cigarettes on a Chico-type cigarette making machine.

EXAMPLE 6

A sample of about 450 grams of ground oat hulls was treated in the same manner as set forth in Example 5, except that the neutralized hydrolysate was warmed and stirred with 10 g. of Darco activated carbon for 15 minutes to remove the characteristic odor of oat hulls normally present in the untreated hydrolysate. The resulting material was further used to prepare a casing formulation, which was then applied to tobacco as in Example 5. The treated tobacco was then used to manufacture cigarettes as set forth in Example 5.

EXAMPLE 7

A 117 lb. sample of ground oat hulls was refluxed for 6 hours with 47 gallons of 1 N sulfuric acid, and the residual solids were removed by filtration. The solution was neutralized with sodium hydroxide, and water was removed by flash and rotary evaporations until a total solids content of 80% was reached.

A total weight of 42 lbs. of the concentrated hydrolysate was incorporated into a standard casing formulation containing no further added sugars, and the mixture thus obtained was applied to 1000 lbs. of a commercial blend of tobaccos in a manufacturing operation. After appropriate blending, cutting, and drying operations, the blend was manufactured into cigarettes by a high speed cigarette making machine.

Sample cigarettes, prepared as described in the examples cited above, along with the appropriate control cigarettes, manufactured in a similar manner but containing standard casing material, were submitted to an experienced taste panel for evaluation of smoke characteristics. All of the samples were judged to have basically similar smoke flavor and a mild, sweet taste.

Cigarettes prepared as described in Example 5 produced smoke having a sweet taste and an aroma and flavor judged to be superior to that from control cigarettes. Smoke produced from cigarettes prepared in Example 6 possessed aroma and taste qualities similar to those derived from control cigarettes, containing a corresponding amount of standard production casing solution.

Cigarettes prepared as described in Example 7, containing 75% of the normal amount of casing solids, were compared with control cigarettes prepared from tobaccos treated in the same manner, except that standard production casing was used instead of oat-hull hydrolysate and this was applied at the normal level (55 lb., at 80% total solids content). Organoleptic evaluation showed no significant differences between the sample and control cigarettes.

What is claimed is:

1. A tobacco product comprising tobacco blended with a casing solution comprising flavor enhancers, humectants and a hydrolysate comprising a mixture of reducing sugars, said reducing sugars being principally comprised of xylose, wherein said hydrolysate is produced by acid hydrolysis of a naturally accuring xylan-containing material.

2. The tobacco product according to claim 1 wherein said naturally occuring xylan-containing material comprises oat hulls.

3. The tobacco product according to claim 2 wherein said hydrolysate is produced by the hydrolysis of an aqueous suspension of oat hulls and adjusted to a pH in the range of about 5 to about 7.

4. The tobacco product according to claim 1 wherein said hydrolysate comprises about 29 to about 40% reducing sugars.

5. The tobacco product according to claim 1 wherein said hydrolysate is blended with the tobacco in the range of about 25 grams to about 250 grams of hydrolysate per kilogram of tobacco.

6. A tobacco product comprising tobacco blended with a casing solution containing flavor enhancers, humectants and xylose.

7. The tobacco product according to claim 6 wherein the casing solution further comprises reducing sugars.

8. The tobacco product of claim 1 wherein said reducing sugars further comprise glucose.

9. The tobacco product of claim 1 wherein said reducing sugars comprise approximately 75% xylose and approximately 25% glucose.

* * * * *